United States Patent
Yoshinaga

[11] Patent Number: 5,962,829
[45] Date of Patent: Oct. 5, 1999

[54] CUSTOMER MANAGEMENT TERMINAL EQUIPMENT, CUSTOMER MANAGING METHOD, AND MEDIA FOR CUSTOMER MANAGEMENT

[75] Inventor: Shinichi Yoshinaga, Kawasaki, Japan

[73] Assignee: Fujitsu Limited, Kawasaki, Japan

[21] Appl. No.: 08/742,955

[22] Filed: Nov. 1, 1996

Related U.S. Application Data

[63] Continuation of application No. 08/350,187, Nov. 30, 1994, abandoned.

[30] Foreign Application Priority Data

Mar. 10, 1994 [JP] Japan ................................. 6-40005

[51] Int. Cl.$^6$ ........................................... G06K 7/10
[52] U.S. Cl. ............................. 235/375; 235/462.1
[58] Field of Search ................................ 235/375, 380, 235/384, 462.1; 335/472; 705/28

[56] References Cited

U.S. PATENT DOCUMENTS

| | | | |
|---|---|---|---|
| 4,417,136 | 11/1983 | Rushby et al. | 235/379 |
| 4,555,618 | 11/1985 | Riskin | 235/384 |
| 4,591,705 | 5/1986 | Toudou | 235/381 |
| 4,608,489 | 8/1986 | Ramsey et al. | 235/462 |
| 4,720,785 | 1/1988 | Shapiro | 235/384 |
| 4,878,771 | 11/1989 | Nishida | 400/70 |
| 4,908,500 | 3/1990 | Baumberger | 235/384 |
| 4,958,064 | 9/1990 | Kirkpatrick | 235/384 |
| 5,065,002 | 11/1991 | Tashiro et al. | 235/472 |
| 5,107,100 | 4/1992 | Shepard et al. | 235/472 |
| 5,121,945 | 6/1992 | Thomson et al. | 283/58 |
| 5,187,351 | 2/1993 | Clary | 235/379 |
| 5,243,655 | 9/1993 | Wang | 235/462 X |
| 5,265,008 | 11/1993 | Benton et al. | 235/379 |
| 5,298,476 | 3/1994 | Hotta et al. | 503/201 |
| 5,334,822 | 8/1994 | Sanford | 235/385 |
| 5,337,361 | 8/1994 | Wang et al. | 235/462 X |
| 5,359,522 | 10/1994 | Ryan | 364/465 |
| 5,382,779 | 1/1995 | Gupta | 235/472 |
| 5,422,473 | 6/1995 | Kamata | 235/384 |
| 5,489,158 | 2/1996 | Wang et al. | 235/462 X |
| 5,491,637 | 2/1996 | Kraemer et al. | 364/468 |
| 5,587,575 | 12/1996 | Leitner et al. | 235/384 |

FOREIGN PATENT DOCUMENTS

| | | | |
|---|---|---|---|
| 63-206861 | 8/1988 | Japan | G06F 15/21 |
| 0442390 | 2/1992 | Japan | 235/380 |
| 2258749 | 2/1993 | United Kingdom | G07S 7/08 |

*Primary Examiner*—Anita Pellman Gross
*Assistant Examiner*—Douglas X. Rodriguez
*Attorney, Agent, or Firm*—Staas & Halsey

[57] ABSTRACT

Customer management terminal equipment manages information on customers at multiservice stations including retail shops such as department houses, financial institutions such as banks, and gas stations. The terminal equipment includes a first converter which converts customer information including customer identification information and transaction information into two-dimensional bar-code information. A two-dimensional bar-code issuing means then issues a two-dimensional bar-code based on two-dimensional information from the first converting means. Customer interaction based on the customer identification information and the transaction information is then commenced.

16 Claims, 12 Drawing Sheets

(1) READ BAR-CODE INFORMATION
(2) VERIFY PREVIOUS SERVICE CONTENT DISPLAYED
(3) OFFER A SERVICE
(4) INPUT THE CURRENT SERVICE CONTENT (ON-LINE/OFF-LINE)
(5) OUTPUT BAR-CODE
(6) PUT BAR-CODE ON A CAR

FIG. 4

```
CUSTOMER No. _____                    YEAR   MONTH   DAY
NAME Mr. _____
COURSE NAME _____ COURSE   RESERVE FUND  ¥ _____
EXPIRATION ____ YEAR ____ MONTH   SHOPPING
                                  CERTIFICATE  ¥ _____
HISTORY _____
        _____
```

12

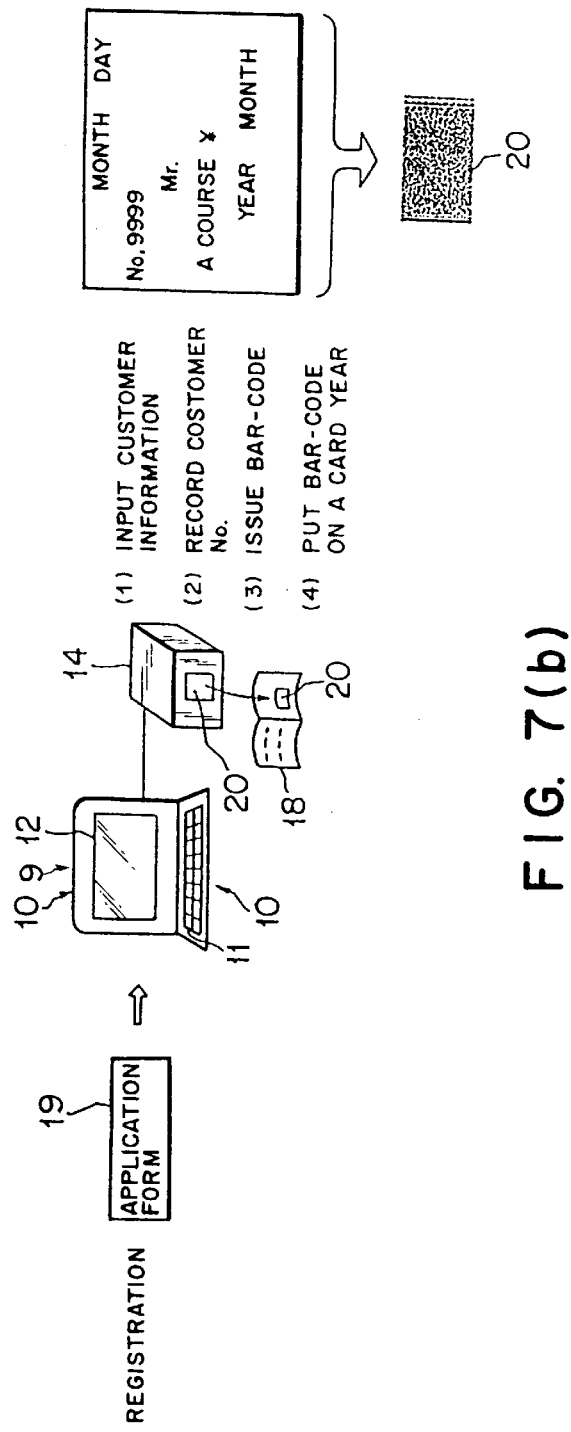
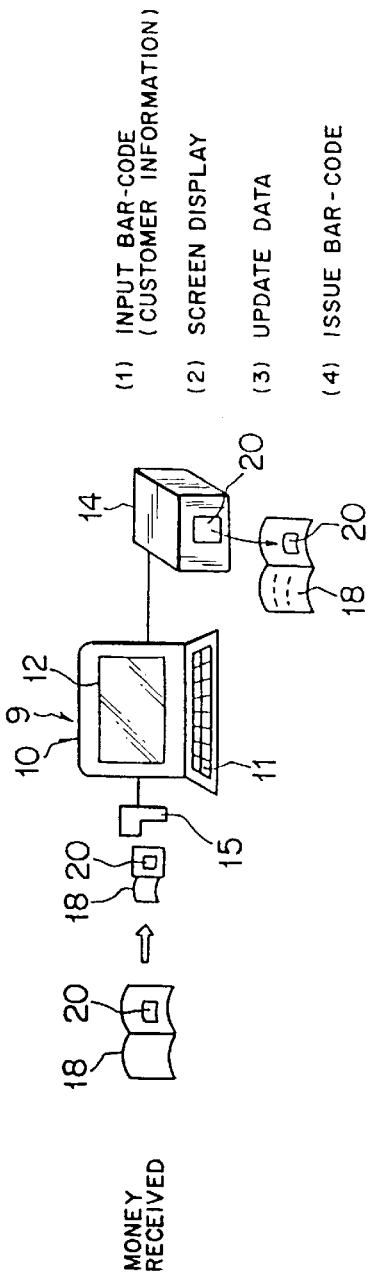

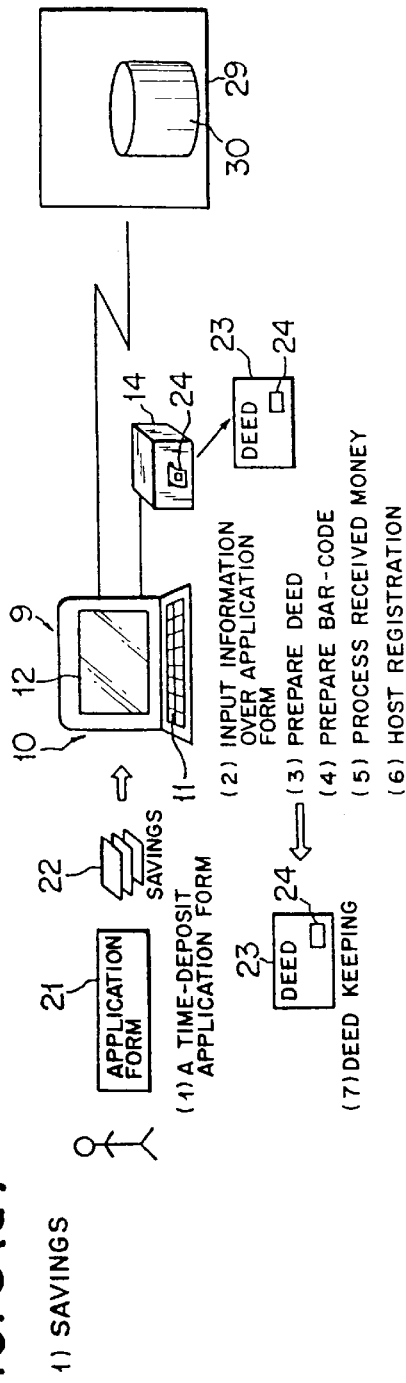
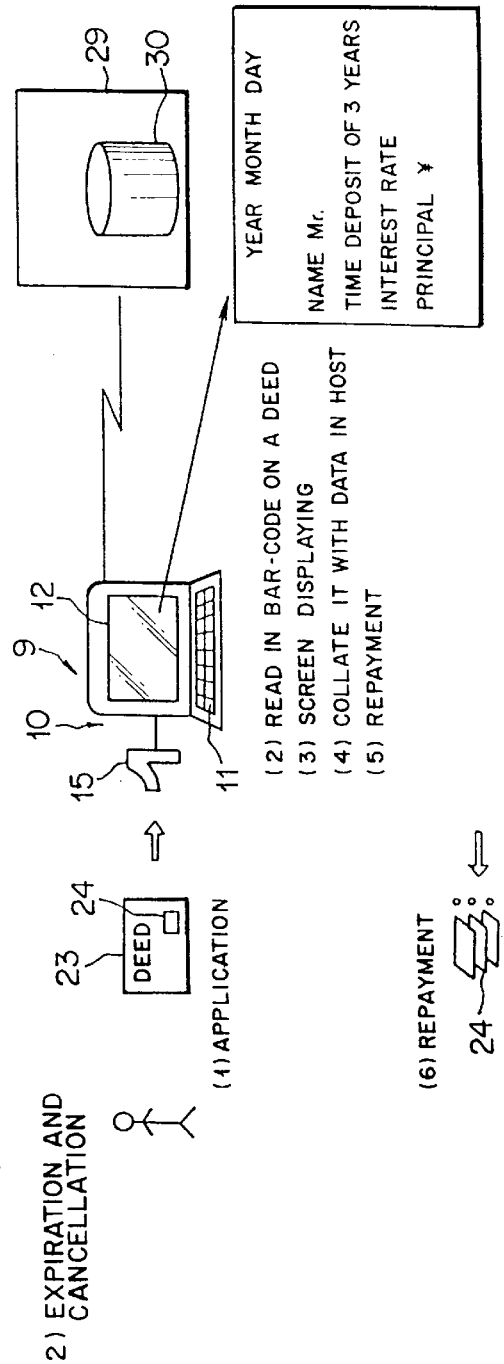

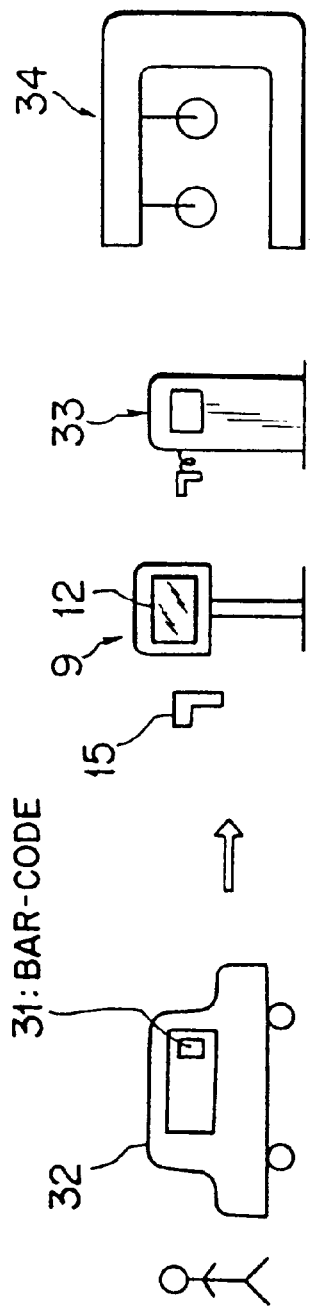

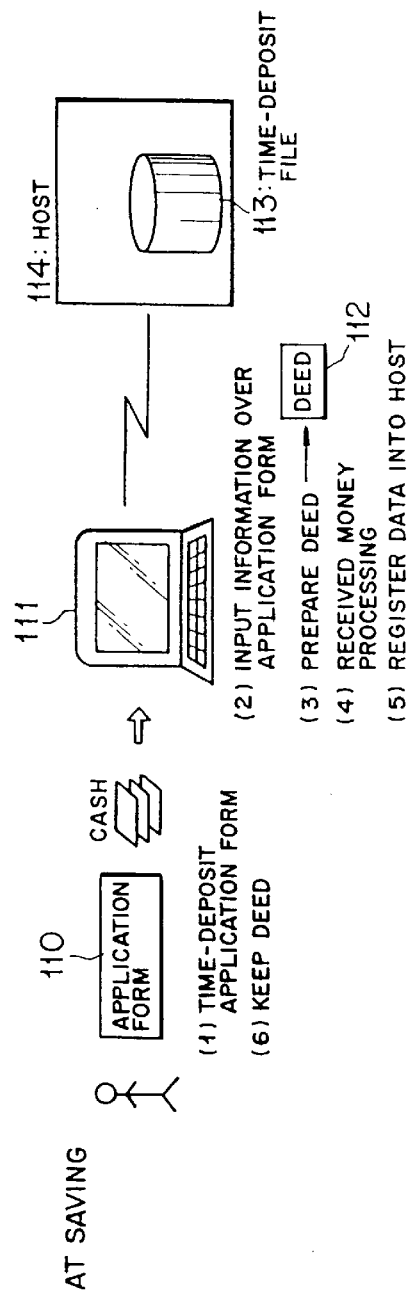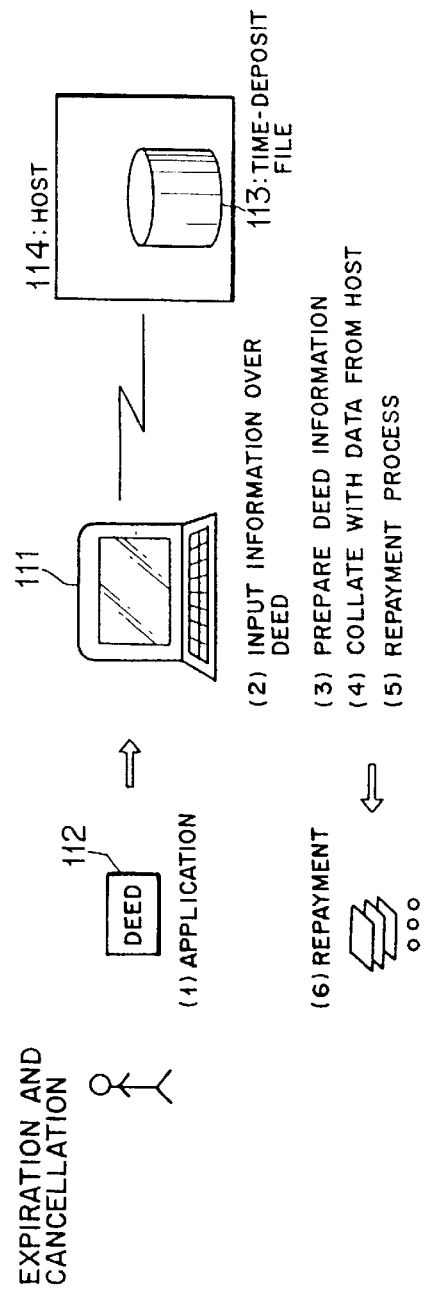

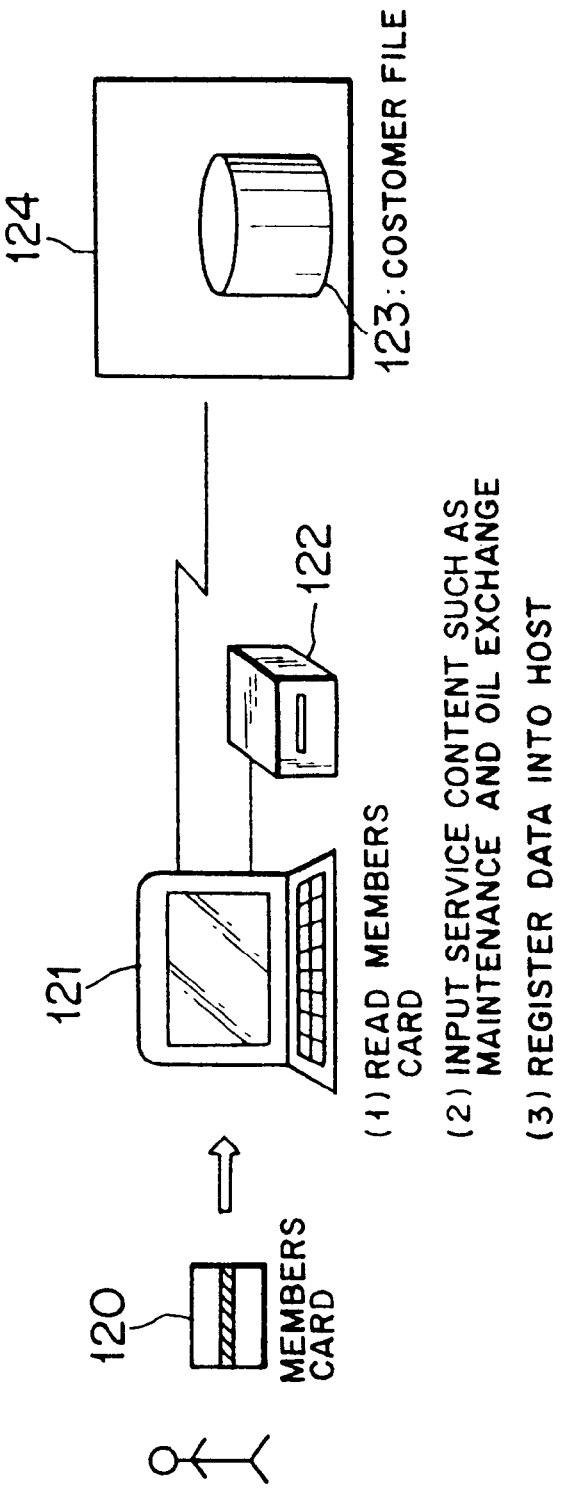

CUSTOMER MANAGEMENT TERMINAL EQUIPMENT, CUSTOMER MANAGING METHOD, AND MEDIA FOR CUSTOMER MANAGEMENT

This application is a continuation of application Ser. No. 08/350,187, filed Nov. 30, 1994, now abandoned.

BACKGROUND OF THE INVENTION

1) Field of the Invention

The present invention relates to customer management terminal equipment suitable for managing information on customers at multiservice stations including retail shops such as department houses, financial institutions such as banks, and gas stations. The present invention also relates to a customer managing method and media for customer management.

2) Description of the Related Art

Recently, in order to provide various types of broad services to customers, systems that manage information on dealings with customers are being introduced in retail shops such as department stores, financial institutions such as banks, vehicle repair shops, or related fields.

In addition to selling goods, some retail shops, for example, are introducing a system (for example, TOMONOKAI, a profit sharing group) where a shop owner registers a customer as a member, saves a reserve fund for the member, and provides a special service beyond the reserve fund.

In such a system, a registered member deposits a fixed amount of money every fixed interval (e.g. each month). At the day of expiration, or a time when money has been completely deposited a predetermined number of times, gift certificates corresponding to the accumulated deposit money plus interest, for example, are given to the member.

The above-described reserve servicing system, for example, is carried out in accordance with the process shown by the schematic diagrams of FIGS. 10 and 11.

Referring to FIG. 10, to apply for a membership for reserve-servicing, a customer fills necessary matters in a prescribed application form 100 and then hands it over to an operator in charge of the reserve servicing.

The operator operates the terminal equipment 101 such as POS (Point-of-Sale) terminals, based on the matters written on the application form 100, to input information (customer's name and reserve servicing) on the customer, assigns a membership number (customer's No.), and registers the customer information and the membership No. into the customer master file 102 within the host 105 including the terminal equipment 101.

Then, a membership card 103, on which a customer identification information (e.g. a membership No.) carried by a customer is hand-written, or a membership card (magnetic card) 103A, on which the information is recorded as magnetic information, is issued.

When a registered member deposits a fixed amount of money at a predetermined interval, the operator, as shown in FIG. 11, operates the keyboard to read the membership No. (customer No.) stored in his membership card 103 (or 103A) in the terminal equipment 101, and then retrieves information regarding customers stored in the customer master file 102 within the host 105 to display the information on the screen 104 of the terminal equipment 101.

Thereafter, when the operator receives money from the customer, the operator executes a certain necessary updating process in accordance with the information displayed on the screen 104. Then the host 105 registers the updated information regarding the customer into the customer master file 102.

This procedure allows the customer to enjoy the above-mentioned reserve servicing.

Some systems, each by which a financial institution such as a bank can offer the time-deposit service to customers, perform the procedure shown by the schematic diagrams in FIGS. 12(a) and 12(b).

In other words, when a customer applies for a time-deposit service, he fills necessary matters in the prescribed application form 110 and then hands it over an operator in charge of the time-deposit servicing.

The operator operates the terminal equipment 111 based on the matters written on the application form 110 to input customer information (information regarding a customer's address and name, and a time deposit service).

Thereafter, the operator completes the bank servicing by preparing and issuing a time deposit deed 112 recording the customer information. Then at the end of the procedure, the customer information is stored into the time-deposit file 113 in the host 114 accommodating the terminal equipment 111. The customer keeps the time deposit deed 112 handed from the operator.

The time deposit is set by the above-procedure. The procedure shown in FIG. 12(b) is performed at the expiration of the time deposit and a cancellation of the same.

That is, the customer shows his time-deposit deed 112 to an operator at a window in a financial institution to apply for the repayment due to the expiration or cancellation of the time deposit.

The operator operates the keyboard to input the information regarding the customer recorded on the deed into the terminal equipment 111 and prepares data regarding the time deposit deed 112 on the screen of the terminal equipment 111.

The data on the screen of the terminal equipment 111 is collated with the content registered in the time deposit file 113 within the host 114. If both contents coincide with each other, the operator executes a routine repaying process.

Such a procedure allows the customer to enjoy the time deposit service.

The institution that provides various kinds of services to customers generally manages the contents of offered services and provides the same on the serviced customers.

Some service stations such as gas stations that provide services for vehicles execute the procedure shown in FIG. 13 to manage the service contents to customers.

Namely a members card 120 in which the customer identification information is recorded, is issued to a customer. When the customer is to be served, the operator reads the customer identification information recorded on the members card 120 using the card information reading unit (e.g. a magnetic card reader) 122 equipped in the terminal equipment 121.

The operator operates the terminal equipment 121 to input the service contents (in this case, e.g. vehicle maintenance and oil exchange information) received by a customer, thus registering the input data into the customer file 123 within the host 124 accomodating the terminal equipment 121. This procedure can manage contents served to the customer.

However, in the reserve servicing systems shown in FIGS. 10 and 12 among the above-described customer information managing means, the customer management information process is performed in such a manner that an operator operates the terminal equipment 101 to input the customer identification information, thus retrieving data recorded in the customer master file 102. Hence there is a disadvantage in that the memory capacity of the customer master file 102 must be increased with an increasing number of customers so that the system maintenance cost is boosted.

In the system that realizes a customer's time-deposit servicing shown in FIGS. 12(a) and 12(b) in a financial institution such as a bank, an operator verifies the customer information regarding the expiration of the time deposit, based on the time-deposit deed 112 brought by the customer and then must re-enter the data written on the time-deposit deed 112 into the terminal equipment 111. Hence, this system burdens the operator with an increased amount of work, thus causing potential erroneous data entry and prolonged the service time at the window.

Moreover, in order to verify the day, time, place, type of services provided previously, and the like, the service content managing means at a multiservice station that provides services for vehicles must retrieve data registered into the customer file 123. As a result, the system construction cost is increased.

It may be considered that information previously serviced is hand-written to record into the members card 120, instead of the customer file 123. However, there is a disadvantage in that the measures may lead to an increase in the service supplier's burden.

SUMMARY OF THE INVENTION

The present invention is made to overcome the above mentioned problems. An object of the present invention is to provide customer management terminal equipment where the simplified system configuration realizes cost suppression, an operator's quick processing, an increased customer management function, and fully-enlarged service content to customers.

Another object of the present invention is to provide a customer managing method which can provide the above-described features.

Still another object of the invention is to provide media for customer management which can provide the above-described features.

In order to achieve the above objects, according to the present invention, the customer management terminal equipment which intereacts with a customer, based on customer identification information inherent in a customer and transaction information on an interaction with the customer corresponding to the customer identification information, is characterized by a first converting means for converting customer information, including the customer identification information, and the transaction information into two-dimensional bar-code information; and a two-dimensional bar-code issuing means for issuing a two-dimensional bar-code, based on the two-dimensional bar-code information from the first converting means.

According to the present invention, the customer managing method which manages transaction information of customers according to customer identification information inherent in customers, is characterized by the steps of converting customer information including the customer identification information and the transaction information into two-dimensional bar-code information, the two-dimensional bar-code information being one converted by customer management terminal equipment that performs an interaction with a customer, based on the customer identification information and the transaction information; the issuing of two-dimensional bar-code information as a two-dimensional bar-code; whereby a customer carries the two-dimensional bar-code issued from the customer management terminal equipment.

Furthermore, according to the present invention, the media for customer management is carried with a customer and manages information regarding the customer. The customer information stored as a two-dimensional bar-code, the customer information including customer identification information inherent in the customer and transaction information of the customer corresponding to the customer identification information.

According to the present invention, the two-dimensional bar-code issuing means can convert customer information including customer identification information and customer-transaction information corresponding to the customer identification information into a two-dimensional bar-code. A customer can carry the two-dimensional bar-code information as a medium for customer management. The customer-transaction information can be managed with a simplified system configuration. The time for procedure to customers can be shortened so that services to customers can be largely improved.

The higher-rank equipment to the customer management terminal equipment does not require any customer master file to store the customer information. This feature allows the system to be constructed at a reduced cost and does not require enlarging the system with an increasing number of customers.

Moreover, this invention does not require preparing a customer master file to store the contents of service, thus allowing the system to be constructed at very low cost.

BRIEF DESCRIPTION OF THE DRAWINGS

FIG. 4 is a block diagram showing the display aspect of a display for a customer management terminal equipment being an embodiment according to the present invention;

FIG. 7(a) is a schematic diagram showing the operation of an embodiment of the present invention;

FIG. 7(b) is a schematic diagram showing the operation of an embodiment of the present invention;

FIG. 8(a) is a schematic diagram showing the operation of a first modification of an embodiment of the present invention;

FIG. 8(b) is a schematic diagram showing the operation of a first modification of an embodiment of the present invention;

FIG. 9 is a schematic diagram showing the operation of a second modification of an embodiment of the present invention;

FIG. 12(a) is a schematic diagram showing a general time deposit servicing system;

FIG. 12(b) is a schematic diagram showing a general time deposit servicing system; and FIG. 13 is a schematic diagram showing a system that manages the contents of the services to which are offered to customers at a general service station.

DESCRIPTION OF THE PREFERRED EMBODIMENTS

Referring to the attached drawings, explanation will be made as for an aspect of the present invention.

(a) The Aspect of the Invention

Figure 1:
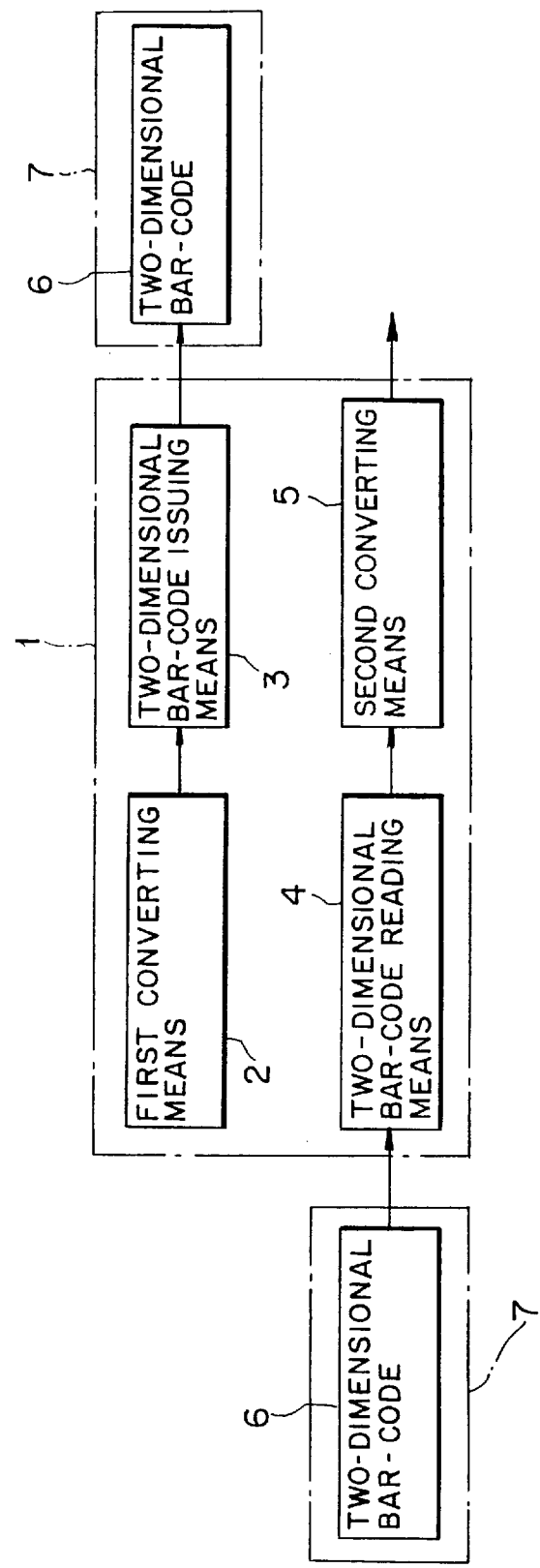
FIG. 1 is a block diagram showing an aspect of the present invention.

FIG. 1 is a block diagram showing an aspect of the present invention. Referring to FIG. 1, the customer management terminal equipment 1 processes interactions with customers, based on customer identification information inherent to a customer and customer transaction information corresponding to the customer identification information. The customer management terminal equipment 1 includes a first converting means 2, a bar-code issuing means 3, a two-dimensional bar-code reading means 4, and a second converting means 5.

The first converting means 2 converts the customer information including customer identification information and transaction information into two-dimensional bar-code information. The bar-code issuing means 3 issues a two-dimensional bar-code 6, based on the two-dimensional bar-code information from the first converting means 2. The two-dimensional bar-code 6 is stuck on the customer management medium 7 carried by the customer to manage information regarding customers.

The two-dimensional bar-code reading means 4 reads the two-dimensional bar-code 6 including customer information. The second converting means 5 converts the two-dimensional bar-code information read by the two-dimensional reading means 4 into customer information.

The customer management terminal equipment 1 acts upon transaction information relating to reserving services for registered members, time deposits, and information serviced to customers in a multiservice station.

The two-dimensional bar-code 6 issued by the two-dimensional bar-code issuing means 3 in the customer management terminal equipment 1 is kept by the customer. In the second transaction with a customer or later, the bar-code reading means 4 in the customer management terminal equipment 1 reads the customer's two-dimensional bar-code 6. Then the second converting means 5 converts the two-dimensional bar-code information into customer information to manage the transaction information regarding interaction with the customer in accordance with customer identification information inherent to the customer.

When the customer management terminal equipment 1 completes the customer interaction process, the first converting means 2 converts customer information including the customer identification information and the new transaction information obtained by the interaction process into two-dimensional bar-code information. Then the two-dimensional bar-code issuing means 3 issues the two-dimensional bar-code information as a two-dimensional bar-code 6. The customer carries the two-dimensional bar-code 6 issued by the bar-code issuing means 3.

The transaction information regarding the reserving service for the registered member can be managed according to the customer identification information inherent to the customer. In this case, the customer carries a registered membership card (medium 7 for customer management), on which, the two-dimensional bar-code 6 is applied.

Moreover, the transaction information regarding time-deposits can be managed according to the customer information inherent to the customer. In this case, the customer keeps a time-deposit deed (medium 7 for customer management) on which the two-dimensional bar-code 6 is applied.

The service information for customers in a multiservice station can be managed according to the customer identification information inherent to the customer. In this case, the customer carries a service card (medium 7 for customer management) with the two-dimensional bar-code 6 applied thereon.

Where the multiservice station provides a service for a customer's vehicle, the two-dimensional bar-code 6 is stuck on the vehicle at a readable position where it can be viewed from outside the vehicle.

As for the customer management terminal equipment 1, the medium 7 for customer management, and the customer managing method, since transaction information for a reserve service, a time-deposit and services at a multiservice station are managed by storing in the form of the two-dimensional bar-code (issued from the two-dimensional bar-code issuing means 3) 6 owned by the customer, it is unnecessary that the higher level equipment to the customer management terminal equipment 1 manages the transaction information regarding all of the customers.

In the second transaction and later, without retrieval by the upper equipment and re-inputting through the keyboard, the transaction information regarding each customer can be obtained by merely reading the two-dimensional bar-code 6 of the customer with the two-dimensional bar-code reading means 4.

As described above, according to the present invention, the two-dimensional bar-code issuing means 3 converts customer information into a two-dimensional bar-code, the customer information including customer identification information and customer transaction information corresponding to the customer identification information. The customer carries the two-dimensional bar-code information as medium 7 for customer management. Without executing the host retrieving and the re-inputting, all customer information and other information associated with the customer information can be restored merely by reading the two-dimensional bar-code 6 with the bar-code reading means 4. Therefore there is an advantage in that simplified equipment can manage the customer transaction information, reduce the time taken for the service procedure to the customer, and contribute to an improved service to customers.

Moreover, there is an advantage in that since the upper level equipment of the customer management terminal equipment 1 does not require any customer master file storing customer information, the system constituting cost can be largely reduced, whereby it is not necessary to enlarge the system with an increasing number of customers.

Furthermore, when a time deposit deed is issued in the time-deposit service, the customer information such as customer's name, address, the expiration date of time deposit, interest and denomination can be recorded in the form of the two-dimensional bar-code 6. Hence, the deed verifying process where the operator verifies the customer information regarding the expiration or cancellation of a time deposit can be performed merely by reading the two-dimensional bar-code 6 with the two-dimensional bar-code reading means 4. This feature eliminates the need to reenter data written on the time-deposit deed brought by the customer. This feature also can reduce the operator's work burden, thus verifying customer information quickly, certainly and efficiently.

In the system that manages the information contents of services conducted for customers in a multiservice station, since the information content of the service previously received by a customer can be recorded in the two-dimensional bar-code 6, the customer can review the same at his next drop-in. Hence the customer can advantageously receive suitable services.

Moreover, there is an advantage in that since no customer master file is needed to store the information contents of services, the system can be constructed at a substantially reduced cost.

(b) Explanation of an Embodiment

Figure 2:
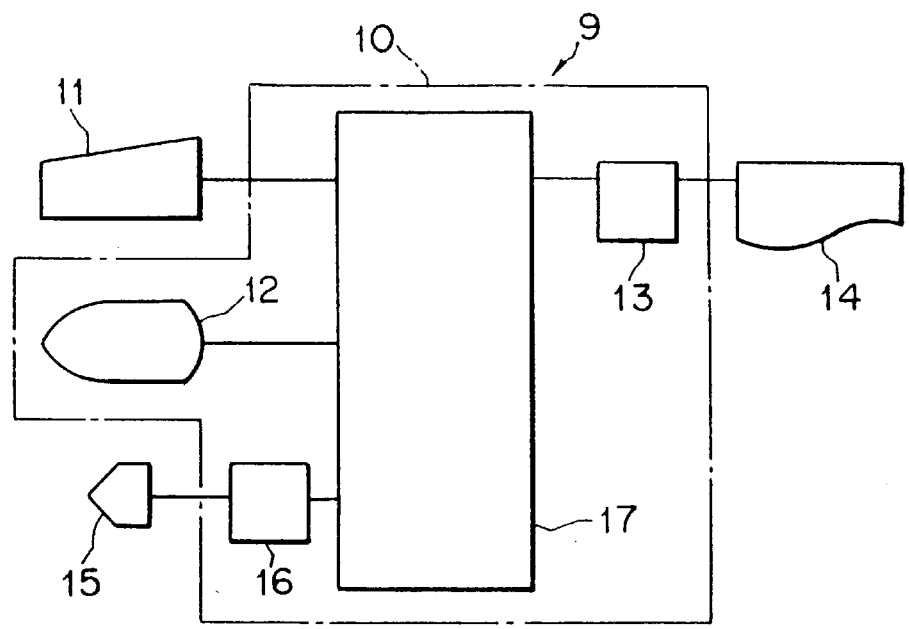
FIG. 2 is a block diagram showing an embodiment according to the present invention.

FIG. 2 is a block diagram showing customer management terminal equipment according to an embodiment of the present invention. Referring to FIG. 2, the customer management terminal equipment 9, for example, is applied to the counter terminal of a POS terminal in a retail shop. The customer management terminal equipment 9 is used for the system (e.g. TOMONOKAI, a profit sharing group) where a customer, registered as a member, reserves money and then enjoys special services over the reserve fund.

Figure 3:
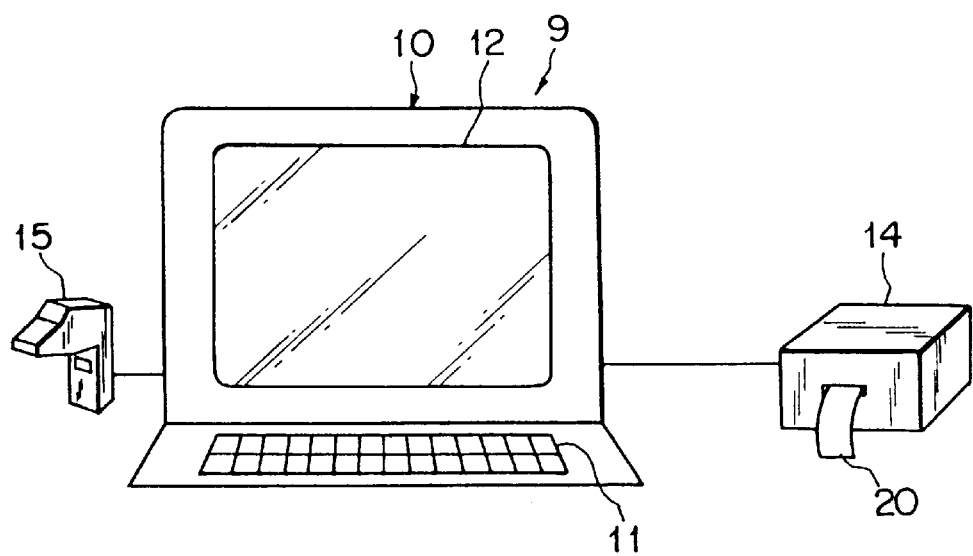
FIG. 3 is a schematic diagram showing the system configuration of customer management terminal equipment according to an embodiment of the present invention.

In other words, the customer management terminal equipment 9 registers members as customer identification information inherent to the customers and performs a dealing process with a customer, based on the registered customer identification information and the transaction information regarding the time deposit of a customer corresponding to the customer information. As shown in FIGS. 2 and 3, the customer management terminal equipment 9 includes a terminal body 10, a printer 14, and a scanner 15. The terminal body 10, as shown in FIG. 2, is formed of a display 12, a bar-code information converting unit 13, a customer information converting unit 16, and a control unit 17.

The operator operates the keyboard 11 to input new customer information including a customer's address, name, and other information as transaction information regarding a reserve fund into the control unit 17 or may update previously input customer information.

The display 12 controlled by the control unit 17 displays customer identification information and information regarding a reserve fund on the screen so that the operator can edit the information with the keyboard 11. As shown in FIG. 4, the display 12, for example, can display customer identification information such as a customer No., name, and reserve fund information such as the course name of the reserve fund, the amount of the reserve fund, the day of expiration, the face value of a shopping thicket issued as a special service for the reserve fund, and the transaction history of a customer.

The bar-code information converting unit (first converting means) 13 is controlled by the control unit 17 to convert customer information including new customer identification information and transaction information input from the keyboard 11 and customer information updated through the keyboard 11 into two-dimensional bar-code information (e.g. PDF417).

Moreover, the printer (two-dimensional bar-code issuing means) 14 prints and issues the two-dimensional bar-code (shown in FIGS. 3 and 5) 20, based on the customer information converted into two-dimensional bar-code information by the bar-code information converting unit 13. The printer 14 may functionally print the customer information of the two-dimensional bar-code information onto the two-dimensional bar-code 20, together with the information (characters displayed) just before the customer information is converted into the two-dimensional bar-code information.

The two-dimensional bar-code 20, obtained by encoding characters such as alphanumerical characters, Kana characters, or Chinese characters, has a memory capacity (e.g. several hundreds kB) which is larger than the conventional bar code. Letter information can be encoded without any change so that read data (i.e., customer information) can be maintained without change. Hence, the bar-code information converting unit 13 encodes the customer information formed of alphanumerical, Kana or Chinese characters into two-dimensional bar-code information without any change. The printer 14 issues the information as the two-dimensional bar-code 20.

The scanner (two-dimensional bar-code reading means) 15 reads in the two-dimensional bar-code 20 including customer information.

Moreover, the customer information converting unit (second converting means) 16 converts the two-dimensional bar-code information read by the scanner 14 into customer information.

The control unit 17 controls comprehensively the customer management terminal equipment 9. As described above, the control unit 17 controls the display of both input information regarding customer information from the keyboard 11 and customer information from the customer information converting unit 16 on the display 12 and the issuance of the two-dimensional bar-code 20 by the printer 14.

The two-dimensional bar-code 20 issued by the printer 14 is stuck on the membership card (registered membership card or medium for customer management) 18 carried with the customer. In the second dealing with the customer and later, the two-dimensional bar-code 20 of the membership card 18 owned by the customer is read with the scanner 15 of the customer management terminal equipment 9. Then the customer information converting means 16 converts the two-dimensional bar-code information into customer information to have dealings with the customer.

When the operator terminates the updating and registering process of the customer information by manipulating the keyboard 11 or scanner 15 for the dealings with a customer, the bar-code information converting means 13 converts the customer information including the customer identification information and new transaction information obtained by the dealing process into two-dimensional information. Then the printer 14 issues the two-dimensional information as two-dimentional bar-code 20. The customer replaces the previous two-dimensional bar-code on the membership card 18 with the newly issued two-dimensional bar-code 20 by sticking it thereon.

The operation of an embodiment with the above system configuration, according to the present invention, will be explained below according to the flow charts shown in FIG. 6, with reference to FIGS. 7(*a*) and 7(*b*).

Figure 6:
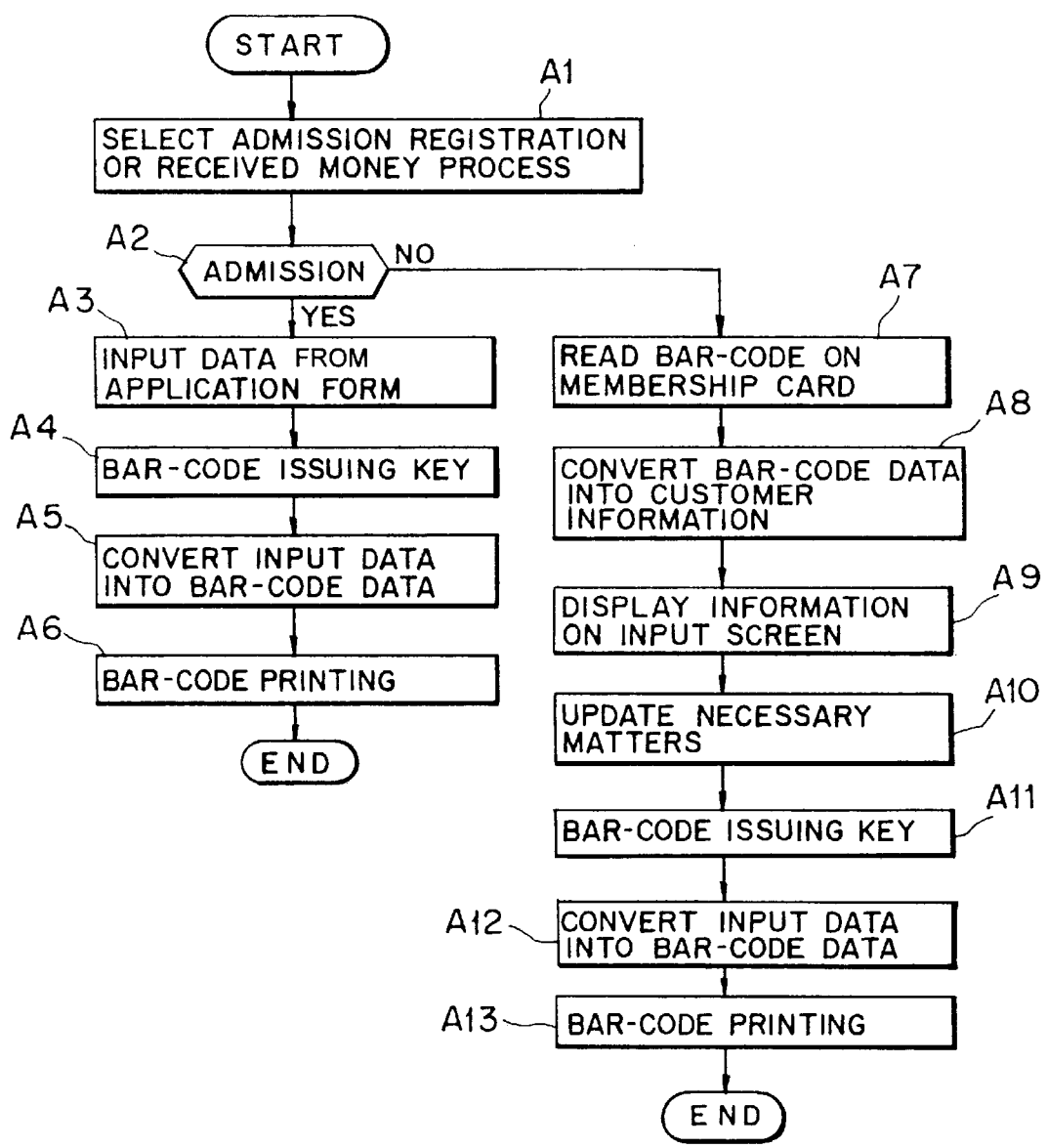
FIG. 6 is a flowchart used for explaining the operation of an embodiment of the present invention.
Figure 10:
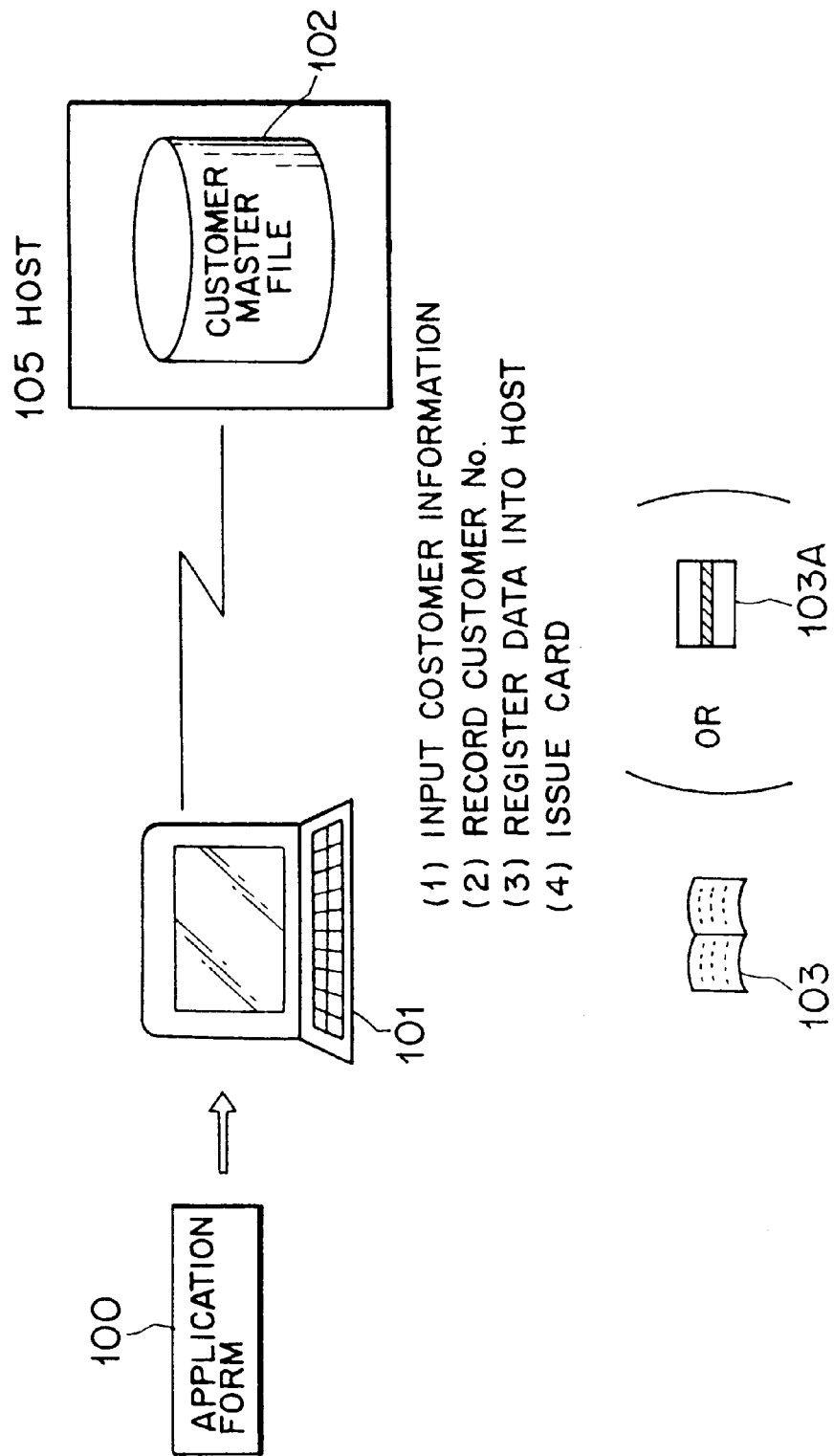
FIG. 10 is a schematic diagram showing a general reserve servicing system.
Figure 11:
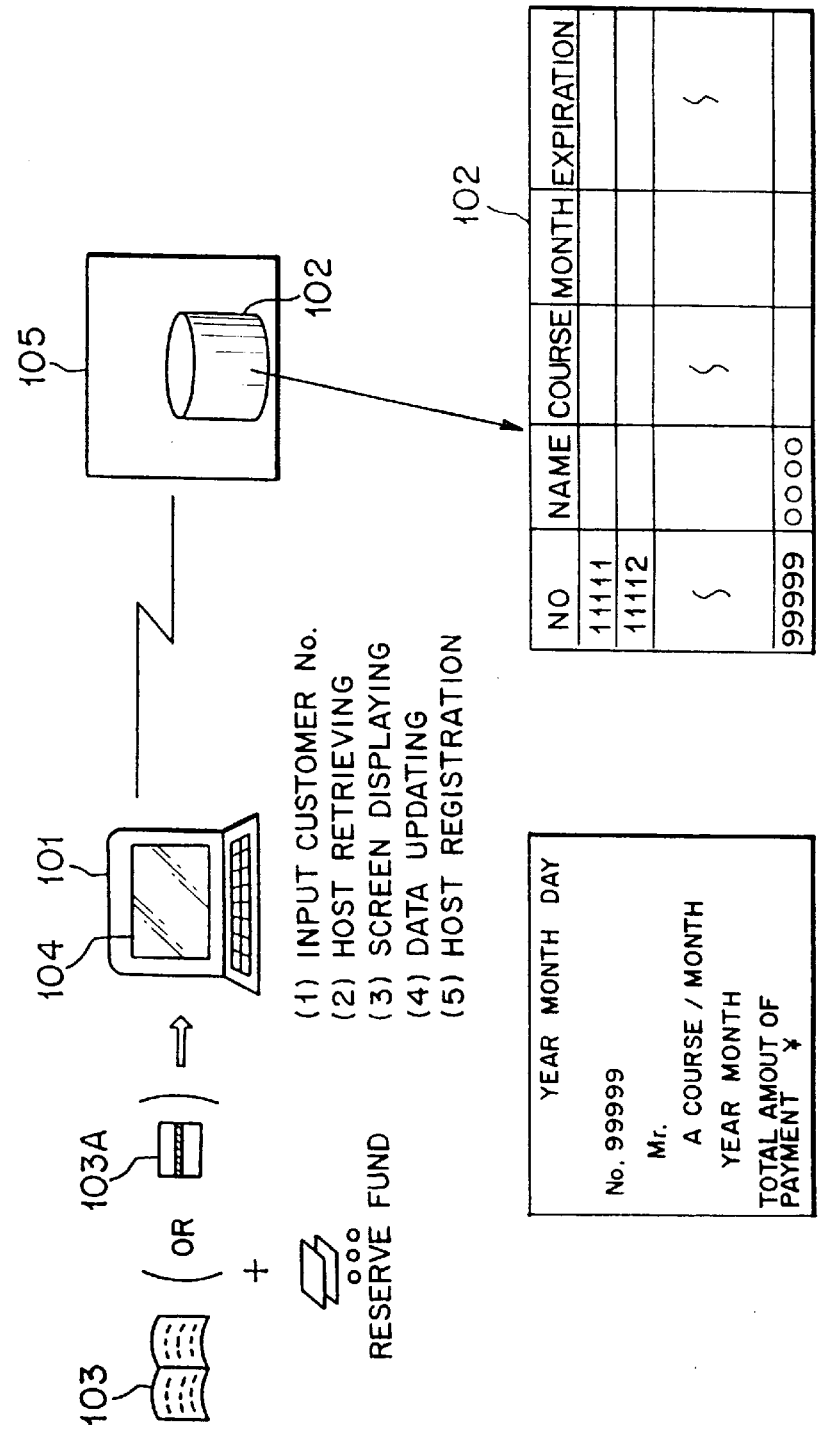
FIG. 11 is a schematic diagram showing a general reserve servicing system.

As shown in FIG. 6, a customer goes to an operator in charge of the customer management terminal equipment 9 to register (enter) a membership into the reserve servicing system (e.g. TOMONOKAI, a profit sharing group) or to select the regular money deposit if he is a registered member. (step A1).

If the customer wants to enter the system (YES in the step A2), he must fill in the appointed matters (including customer identification information such as customer's No. and name, reserve information such as a course name of reserve fund, the amount of reserve fund, the date of expiration, the face value of a shopping ticket issued as a special service for a reserve fund, and transaction history) in a prescribed application form 19 and then hand it to an operator. The operator then enters the data of the application form 19 using the keyboard 11 of the customer management terminal equipment 9, while referring to data on the display 12 (step A3).

When the appointed matters are input into the customer management terminal equipment 9, the operator assigns a specific membership number (a customer No.) and then manipulates a bar-code issuing key (not shown) of the keyboard 11 (step A4). Before issuing the bar-code, the appointed matters may be once displayed on the display 12 to confirm the same.

The control unit 17 (referring to FIG. 2) controls the bar-code information converting unit 13 to convert all the customer information input from the keyboard 11 into two-dimensional bar-code information (step A5). The printer 14 then prints and issues the two-dimensional bar-code information as a two-dimensional bar-code 20 (step A6).

Figure 5:
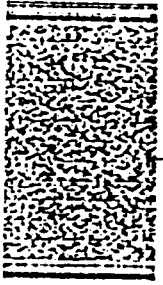
FIG. 5 is a diagram showing an example where a two-dimensional bar-code issued with a printer is put on a membership card being an embodiment of the present invention.

The two-dimensional bar-code 20 issued from the printer 14, as shown in FIG. 5 and FIG. 7(a), is stuck on the membership card 18 where a newly set membership No., name, address, family's member names, reserve fund course, day of expiration, and amount of a reserve fund are written. The membership card 18 is then handed to the customer. Thus the application procedure is completed.

In order to deposit a reserve fund at the shop next time, the customer has to bring the membership card 18.

In this case, although the two-dimensional bar-code 20 and various necessary matters are separately printed on the membership card 18, they may be printed at the same time on the membership card 18.

When a registered member deposits money (NO decision in the step A2), an operator, as shown in FIG. 7(b), reads the two-dimensional bar-code 20 stuck on membership card 18 using the scanner 15 (step A7).

The customer information converting unit 16 converts the two-dimensional bar-code information read by the scanner 15 into original customer information formed of character information (step A8) and then displays the outcome on the display 12 under the control of the control unit 17 (step A9).

Then the operator operates the keyboard 11 to input the amount of a reserve fund brought by the customer, over referring data on the display 12, thus updating the customer information (step A10).

In the step A10, at the completion of the customer information updating, the operator operates a bar-code issuing key (not shown) of the keyboard 11 (step A11).

In response to the operator's bar-code issuing key operation, the control unit 17 controls the bar-code information converting unit 13 to convert the updated customer information into two-dimensional bar-code information (step A12). Then the printer 14 prints and issues the two-dimensional bar-code information converted by the bar-code information converting unit 13 as a two-dimensional bar-code 20 (step A13).

The new two-dimensional bar-code 20 issued by the printer 14 is then affixed on the membership card 18, instead of the original two-dimensional bar-code stuck thereon. Thus the updating procedure is completed.

As described above, according to the embodiment of the present invention, since the necessary customer information can be recorded and maintained as a two-dimensional bar-code 20, it is unnecessary to set a customer master file to store the customer information of all customers into the higher level equipment (host) to the customer management terminal equipment 9. Hence, there is an advantage in that the system construction cost can be largely reduced and it is unnecessary to enlarge the system with an increasing number of customers.

Moreover, since merely reading the two-dimensional bar-code 20 allows a capture of customer information and no access retrieving time to the customer master file, customer information can be utilized efficiently and with a short access time. As a result, there is an advantage in that the procedure time for customers can be reduced and the services to customers can be largely improved.

The customer master file may be stored in the host. In this case, according to the present embodiment, since customer information can be respectively obtained from the two-dimensional bar-code 20, it is unnecessary to connect the customer management terminal equipment to the host.

The data of the customer master file stored in the host can be updated by transmitting data updated after the periodic process to the host. In this case, even if the customer management terminal equipment 9 is not connected to the host, the data can be updated by obtaining the customer information with reference to the content of the two-dimensional bar-code 20. The host updating can be performed later via the memory media. This updating system is particularly efficient when the reserving process is carried out using the POS system.

(b1) Explanation of First Modification of the Embodiment

In the above-embodiment, the case where a money reserving system is applied for the customer management terminal equipment 9 has been described. The first modification where a financial institution such as a bank uses the customer management terminal equipment 9 as a time-deposit serving system will be explained later with reference to FIGS. 8(a) and 8(b).

As shown in FIGS. 8(a) and 8(b), this modification is basically the same as the system configuration of the foregoing embodiment, except that the customer management terminal equipment 9 is housed in the host 29 having the time-deposit file 30 and the two-dimensional bar-code 24, which is issued with the printer 14 and carried by a customer, records and holds customer information regarding the customer's address, name, and time-deposit service.

Information regarding the time-deposit service includes in concrete the day of expiration of a time-deposit, an interest, and a denomination.

The modified system configuration of the embodiment operates as follows:

Referring now to FIG. 8(a), when a customer applies for a time-deposit service, he fills the necessary matters (information regarding a customer's address, name and a time-deposit service) in a prescribed application form 21. Then he presents the complete application form 21 to an operator in charge of the customer management terminal equipment 9 to receive a time-deposit service.

The operator manipulates the customer management terminal equipment 9 in accordance with the matter written in the application form 21 to input the customer information regarding a customer's address, name and a time-deposit service).

When the appointed matters have been completely input, the operator prepares a time-deposit deed (medium for customer management) 23 and then issues the two-dimensional bar-code 24 by operating the bar-code issuing key of the keyboard 11.

Namely, in response to the operation of the bar-code issuing key, the control unit 17 (shown in FIG. 2) controls the bar-code information converting unit 13 to convert all the customer information input from the keyboard 11 into two-dimensional bar-code information. The printer 14 then prints and issues the information as the two-dimensional bar-code 24.

Thereafter, the operator subjects the cash 22 from the customer to a money depositing process and then registers and stores the customer information input through the keyboard 11 into the time-deposit file 30 in the host 29.

The two-dimensional bar-code 24, printed out of the printer 14, is stuck on the time-deposit deed 23 prepared for a time deposit. The time-deposit deed 23 is then received by the customer. Thus, the application procedure has been completed.

When the customer cancels the time-deposit because of expiration or cancellation, he carries the time-deposit deed 23 with him to the bank to request the procedure or process shown in FIG. 8(b).

In response to the customer's request, the operator reads the two-dimensional bar-code 24 on the time-deposit deed 23 brought by the customer using the scanner 15.

The customer information converting unit 16 converts the two-dimensional bar-code information read with the scanner 15 into the original information, formed of character information, to display the data on the display 12.

The control unit 17 then checks the customer information read with the scanner 15 against the customer information stored in the time-deposit file 30 in the host 29.

Since a coincidence of both information proves the time-deposit deed 23 to be genuine, the operator repays the customer the predetermined amount of money 24 for the expiration or cancellation. Thus the procedure for making an expiration or cancellation of a time-deposit has been completed.

As described above, according to the first modification of the embodiment of the invention, when the time-deposit deed 23 is issued in the time-deposit service, the customer information regarding the customer's address, name, the day of expiration of the time deposit, the interest, and the denomination is recorded and stored as the two-dimensional bar-code 24. Hence, in order to verify the customer information in the expiration or cancellation of the time deposit, an operator can perform the time-deposit deed verifying process merely by reading the two-dimensional bar-code 24 using the scanner 15. It is unnecessary to re-enter data written on the time-deposit deed 23 brought by the customer, using the keyboard 11. Hence, the system can release the operator's work amount, thus preventing an operator's erroneous inputting. There is an advantage in that customer information can be checked quickly, certainly, and efficiently so that services to customers can be improved.

(b2) Explanation of Second Modification of the Embodiment

In the second modification of the present embodiment, an explanation will be made below for the case where the customer management terminal equipment 9 is employed in the system that manages the content serviced to a customer (services for the motor-vehicle of a customer) at a service station or gas station, with reference to FIG. 9.

As shown in FIG. 9, the customer management terminal equipment 9 according to the present modification is equipped as a service post at a gas station. The customer management terminal equipment 9 is basically the same as the system configuration of the above-mentioned embodiment, except that the printer 14 issues the two-dimensional bar-code 31 on which the customer information regarding a customer's address, name, and service offered by the service station is recorded.

In concrete, information regarding services offered by the service station includes the date at which gasoline was purchased, the amount of gasoline purchased, the fuel consumption operated based on a running distance input, the date of a previous oil-exchange, and the date of a previous car-wash.

In the present modification, the two-dimensional bar-code 31 issued by the printer 14 is not stuck on the customer's membership card, but is stuck, as shown in FIG. 9, on the motor-vehicle 32 so as to be recognized from outside thereof. In FIG. 9, numeral 33 represents an oil filling machine and 34 represents a wash/repair shop.

As for the present modification with the above-system configuration, the case where a customer wants some services at a service station will be explained below with reference to FIG. 9.

When a customer in the motor-vehicle 32 drives into a service station (gas station), an operator reads the two-dimensional bar-code 31 with the scanner 15.

The customer information converting unit 16 converts the two-dimensional bar-code information read out by the scanner 15 into the customer information formed of the original character information to display the outcome on the display 12.

The display 12 displays information including the previous gasoline purchase date, the amount of gasoline purchased, fuel consumption based upon a running distance input, the date at which oil was last changed, and the date of the last car wash. The operator checks the information and then decides the current service to be made with the fuel filling machine 33 or the car wash/repair shop 34.

As for the fuel consumption based upon a running distance input, for example, an operator operates the keyboard 11 (not shown in FIG. 9) to input the running distance reported from a customer. The operational processor (not shown) in the control unit 17 calculates the fuel consumption based on the consumption of gasoline to display the result on the display 12.

When the customer has completed service, the operator operates the keyboard 11 of the customer management terminal equipment 9 to input the contents of the offered service. Then the operator operates the bar-code issuing key on the keyboard 11 to make the printer 14 issue the two-dimensional bar-code 31.

The issued two-dimensional bar-code 31 is then stuck on the motor vehicle 32, in place of the bar-code which records the information regarding the previous services. This two-dimensional bar-code 31 may also be stuck on a service card (medium for customer management), instead of the motor-vehicle 32.

As described above, according to the present modification, the two-dimensional bar-code 31 can record and store the services received previously by customers in facilities (e.g. gas stations) such as service stations where various kinds of services are presented to customers. When the customer drops again in the service station, the operator can easily know the service content presented previously to the same, thus presenting a timely service suitable to the customer.

Hence the above system configuration requires no customer master file to store the contents of services and allows the system to be constructed at a very low cost. Moreover, in the case of the use of the host with the customer master file, the customer information can be accessed from the two-dimensional bar-code 31 so that it is unnecessary to connect the customer management terminal equipment 9 to the host.

Moreover, according to the second modification, there is an advantage in that since the two-dimensional bar-code 31 stuck on the motor vehicle 32 can be read from outside the motor vehicle 32 without showing the card, a quick service can be made.

In the present modification, the two-dimensional bar-code records the contents of services presented for motor vehicles, for example, at a gas station. However, it should be noted that the present invention is not limited only to the presented embodiments. It is obvious that the present invention can be applicable to systems that manage the contents of other services.

What is claimed is:

1. Automobile service station terminal equipment which interacts with a customer, based on customer identification information inherent to a customer and transaction information relating to a transaction with the customer and corresponding to the customer identification information, comprising:

bar-code reading means for reading a first two-dimensional bar-code having first two-dimensional bar-code information including first customer identification information and first customer transaction information, wherein the first two-dimensional bar-code is stuck on a motor vehicle in a manner so as to be recognized from outside thereof;

means for receiving non-encrypted second customer transaction information consisting of an amount of gasoline purchased, running distance information, a date of a previous oil-exchange, and a date of a previous car wash;

first converting means for converting said first customer identification information, said first transaction information, and said second transaction information into second two-dimensional bar-code information such that a host computer containing a customer master file is not used; and two-dimensional bar-code issuing means for issuing a second two-dimensional bar-code based on the second two-dimensional bar-code information, wherein said second two-dimensional bar-code is stuck on the motor vehicle in place of said first two-dimensional bar code such that it is unnecessary to connect said automobile service station terminal equipment to a host computer to re-retrieve said second two-dimensional bar-code information relating to said customer.

2. The automobile service station terminal equipment according to claim 1, further comprising:

second converting means for converting the first two-dimensional bar-code read by said bar-code reading means into said first customer identification information.

3. The automobile service station terminal equipment according to claim 1, wherein said first transaction information comprises a date of a previous oil change.

4. The automobile service station terminal equipment according to claim 1, wherein said first transaction information comprises a date of a previous car wash.

5. The automobile service station terminal equipment according to claim 1, wherein said first transaction information comprises a date of a previous gasoline purchase.

6. The automobile service station terminal equipment according to claim 1, wherein said second transaction information comprises information on services for a customer at a multiservice station.

7. The automobile service station terminal equipment according to claim 1, wherein said second transaction information is displayed to the customer during interaction with the customer.

8. An automobile services station method which manages transaction information for each of a plurality of customers according to customer identification information inherent to each of said plurality of customers, comprising the steps of:

reading a first two-dimensional bar-code having first non-encrypted two-dimensional bar-code information including non-encrypted customer identification information and first non-encrypted customer transaction information, wherein the first two-dimensional bar-code is stuck on a motor vehicle in a manner so as to be recognized from outside thereof;

receiving new customer transaction information from a new customer interaction consisting of an amount of gasoline purchased, running distance information, a date of a previous oil-exchange, and a date of a previous car wash;

combining said first customer transaction information and said new customer transaction information into second customer transaction information with customer management terminal equipment;

converting said customer identification information and said second customer transaction information into second non-encrypted two-dimensional bar-code information such that a host computer containing a customer master file is not used; and issuing said second two-dimensional bar-code information as a second two-dimensional bar-code, wherein said second two-dimensional bar-code is stuck on the motor vehicle in place of said first two-dimensional bar code such that it is unnecessary to connect said customer management terminal equipment to a host computer to retrieve said second two-dimensional bar-code information relating to said customer.

9. The automobile service station method according to claim 8, further comprising the steps of:

reading said second non-encrypted two-dimensional bar-code stuck on the motor vehicle including the second two-dimensional bar-code information with said customer management terminal equipment;

converting the second non-encrypted two-dimensional bar-code information into said customer identification information and said second customer transaction information; and receiving second new customer transaction information from a second customer interaction.

10. The automobile service station method according to claim 9, further comprising the steps of:

combining said second customer transaction information and said second new customer transaction information into third customer transaction information with said customer terminal management equipment;

converting said customer identification information and said third customer transaction information into third non-encrypted two-dimensional bar-code information; and issuing said non-encrypted third two-dimensional bar-code information as a third two-dimensional bar-code, wherein said third two-dimensional bar-code is stuck on the motor vehicle in place of said second two-dimensional bar code.

11. The automobile service station method according to claim 8, wherein said first customer transaction information comprises a date of a previous oil change.

12. The automobile service station method according to claim 8, wherein first customer transaction information comprises a date of a previous carwash.

13. The automobile service station method according to claim 8, wherein said second customer transaction information comprises fuel consumption data based upon running distance information.

14. The automobile service station method according to claim 8, wherein said first customer transaction information comprises a date of a previous gasoline purchase.

15. The automobile service station method according to claim 8, wherein said second customer transaction information is displayed to the customer during interaction with the customer.

16. The customer managing method according to claim 8, wherein said second customer transaction information comprises service information for the customer at a multiservice station.

* * * * *